Patented Oct. 31, 1950

2,527,581

UNITED STATES PATENT OFFICE 2,527,581

TREATMENT OF EARTH FORMATIONS

Jay C. Searer, Kenmore, Alvin F. Shepard, Tonawanda, and Frank W. Less, Kenmore, N. Y., assignors to Durez Plastics and Chemicals, Inc., North Tonawanda, N. Y.

No Drawing. Application August 1, 1945, Serial No. 608,350

6 Claims. (Cl. 166—22)

The present invention relates to a method of treating earth formations and sealing the permeability thereof and to a composition suitable for effecting such treatment. More particularly, the invention relates to the treatment of earth structures in oil wells where it is desired that such structures shall be made relatively impermeable to water.

An object of the invention is to provide a composition that will produce a permanent relatively impermeable seal under any existing condition in an oil and water producing formation in a definite and predetermined time period.

Oil is produced from several different types of permeable earth formations. These productive horizons are at distances considerably removed from the earth's surface and are reached by a well bore through which normal production takes place. If high pressures exist in the productive zones, oil will flow to the surface. As the pressure diminishes, or in low pressure areas, the oil is brought to the surface by means of mechanical devices such as pumps, gas lifts, etc. Oil is produced from such productive zones until it no longer becomes economically practical.

The structure of the productive horizons varies considerably not only from area to area but also from bore to bore, be they only a few feet apart. Variations lie in thickness of production zone, permeability, temperature, pressure, gravity of oil, gravity and pH of water, etc.

The well bore passes through many different formations before reaching the oil producing horizon. Some of these formations are water bearing. The steel casing which is placed in the well and cemented into position with Portland cement usually prevents these waters from reaching the oil productive zone and interfering with oil production although they are the source of occasional trouble.

In the majority of the oil fields there lies directly below the oil bearing horizon a salt water zone at pressures equivalent to those found in the oil horizons. It is these underlying waters that are the source of frequent trouble. If a well bore is drilled too deep and is breaking through the oil horizon into the underlying water zone, the water will enter the well bore in ever increasing amounts. If a well is allowed to flow too hard or is pumped too hard, it will gradually cause the water to create a channel into the well bore and enter it in ever increasing amounts.

Between the oil producing horizon and underlying water zone, there exists an oil and water point of contact. This point of contact will, of course, gradually rise as the oil is removed and when it reaches the bore hole, water will enter it in ever increasing amounts.

The waters that enter the bore hole have a tendency to emulsify with the oil to a degree that will vary considerably in different localities. Some of these emulsions are easily broken and some are extremely difficult to break. Practically in all cases the emulsions must be heat and chemically treated to get water separation and the production of "pipe line oil."

Other disadvantages associated with production of oil and water mixtures are: increased pumping costs, salt water corrosion of equipment, salt water disposal costs, etc.

The various compositions suggested and tried to seal off the entering water and thereby recover greater quantities of the oil held by the productive horizons can be divided into 5 definite groups:

1. Thermoplastic resins.
2. Gel forming materials.
3. Resin forming liquids.
4. Thermosetting resins.
5. Inorganic cements.

Group 1.—The thermoplastic resins

Covers such materials as asphalts, natural resins and pitches. The general procedure was to heat the fluids of a well bore to at least the melting point of the substance used, melting the substance, placing it in position and allowing the whole to cool to normal temperature. The difficulty in handling and spotting these materials as well as subsequent manipulations have for all practical purposes eliminated them from present day considerations. To eliminate the necessity of heating the well bore fluids and melting the sealing substance, solvent solutions of these materials were placed in the permeable zones and then precipitated in position. Results were very uncertain and not permanent.

There are many localities where the normal well bore temperature is always considerably above the melting points of the substances used. The difficulties encountered in such localities are quite obvious.

Group 2.—Gel forming materials

Covers such materials as gelatin-formaldehyde, silicate and magnesia gels. Suitable mixes of various ingredients used were made up and spotted at the desired point in a permeable zone of a well bore and allowed to gel. Invariably some or all of the components are water soluble and as a result spread over a much greater area than desired. Some of the gels formed had poor water resistance so that the barrier formed had no permanency.

The uncertainy and lack of permanency has also eliminated these materials from present day consideration.

*Group 3.—Resin forming liquids*

Covers such materials as styrene, vinylidene chloride, phenol-aldehydes, phenol-furfural, furfural thiourea, vinyl chloride, vinyl acetate, urea-formaldehyde, etc. These various substances can be used to successfully seal permeable zones in oil and water producing earth formations but the results are difficult to predict and very uncertain. For example, using a phenol-formaldehyde resin forming liquid and conducting the reaction in the permeable zone of a well bore, no uniformly satisfactory seal can be accomplished. Phenol-formaldehyde mixtures are water soluble. When such a mixture is placed in position in a permeable zone, cavern or channel, it will become diluted to some degree by the water present in such zones which tends to slow down its reactivity. Although the permeable zone, cavern or channel is properly filled with the resin forming liquid, it becomes only partially filled with the set resin after the reaction has been completed. A phenol-formaldehyde mixture does not completely convert into a resinous mass. When reaction sets in, a separation takes place forming an oily resinous layer which will eventually polymerize to a hard mass and a water layer which is composed of the water in the formaldehyde used, the water picked up by the mixture by dilution and the water formed in the reaction. It is quite obvious, therefore, that with such manipulations, so complete seal can be accomplished.

Similar difficulties are encountered with other resin forming liquids such as phenol-furfural, furfural-thiourea, etc., particularly when used with conventional water soluble catalysts such as hydrochloric acid, sulfuric acid or caustic soda. Compositions such as styrene, vinyl chloride, vinyl acetate, vinylidene chloride, prepared with suitable catalysts cannot be shipped to "locations" but must be prepared on "location." The change from a mobile liquid to a stiff liquid is rapid and in most cases entirely too rapid to enable an operator to place the liquid in the desired location and still have a liquid of a viscosity low enough to get proper penetration of a permeable zone. Although the change in viscosity from a mobile liquid to a stiff liquid is rapid, the change from a stiff liquid to a solid is very slow, requiring from 12 to 48 hours. Due to this slow change, any existing turbulence in the bottom of a well bore will cause the material to "roll" creating a stringy mass and effecting no seal whatsoever. Furthermore, these substances in their final stage are thermoplastic or semithermoplastic so their use is limited to localities where the well bore temperature does not exceed the softening point of the substance used.

*Group 4.—Thermosetting resins*

Covers such materials as phenol-aldehyde resins, phenol-furfural resins, urea-formaldehyde resins, furfural-thiourea resins and the series known as "phenolic" which includes such materials as cresols, xylenols, and an aldehyde. Polymerization of these substances to liquid resins either on location or in central plant and before spotting in a permeable zone, then further catalyzing with suitable catalysts or accelerators eliminates some of the disadvantages but does not produce an ideal material. Catalysts ordinarily necessary to accelerate the polymerization of these liquid resins are strong mineral acids such as hydrochloric or sulfuric. It is extremely difficult and, in most instances, impossible to add to a strong mineral acid accelerator to a liquid resin without instantaneously setting up the resin wherever the acid strikes it. Diluting the acid with water eliminates this difficulty but reduces its effectiveness. Properly accelerated liquid resins will polymerize to hard, infusible and insoluble masses under the conditions found in a permeable zone of a well bore. The time, of course, is entirely dependent upon the amount of accelerator used and the temperature in the well bore. Polymerization starts immediately after the accelerator has been added and proceeds slowly. The viscosity increases and eventually the liquid mass becomes a solid.

*Group 5.—Inorganic cements*

Covers such materials as Portland cement and plaster of Paris which have been used as sealing compositions in permeable zones of an oil and water producing earth formation. They are granular in nature and with water produce suspensions or colloids. The particle size is entirely too large for proper distribution in a permeable structure of an oil and water producing horizon and cannot be used for this purpose although they are being used successfully to seal off the waters that enter a bore hole through a cavern or a large channel. The adhesion of various cements to the side walls of caverns or channels is poor and the bond is gradually broken down by the water creating new channels. The seal or "shut off" accomplished is temporary.

There are two basic types of oil producing horizons. One is the sand structure usually identified by name such as the "Wilcox," "Woodbine," etc., and the other, a limestone or chalk structure usually identified as chalk, oolitic limes or dolomites. The sands are silica deposits and the limestones are alkaline earth deposits.

Due to the chemical inertness of silica sand bodies, most any type of sealing compound can be injected into them without effecting a change either in the sand or in the sealing composition used. This is not the case in limestone formations. For example, sealing compositions that will set only when the pH is less than 7 or those that are dependent upon acid acceleration to set are troublesome to use. The calcium compounds found in such formations can destroy the setting characteristics of such sealing substances and in addition form, in many instances, water soluble salts so that, instead of being sealed, such a formation is made more permeable or more porous. It is therefore essential that the sealing composition used in a limestone formation be of such nature that its setting characteristics are either unaffected or preferably accelerated by the calcium compounds present.

We have discovered that a successful sealing composition for sealing permeable zones in an oil and water producing earth formation and particularly a limestone formation must have:

1. A limited solubility in water to prevent dilution in the well bore causing too great a spread.

2. A specific gravity higher than any of the fluids found in a well bore to prevent flotation.

3. A low viscosity at well bore temperatures to obtain proper penetration of the sealing composition into the permeable zone.

4. Sufficient reactivity at the existing temperature of a limestone earth structure to be able to convert from a mobile liquid to a gel.

5. Setting characteristics either unaffected by limestone formations or accelerated by them.

6. No adverse effect on the limestone formation other than sealing it.

It is not always the underlying waters in a limestone oil bearing formation that cause difficulties in oil production. It is a well recognized fact that limestone formations are filled with many channels, crevices and caverns wherein the oil is trapped and from which it is fed into a well bore. There are also many new channels and crevices formed during the time a well is produced. Eventually some of these faults in the earth structure break into water which is then fed into a well bore.

It is an object of the present invention to provide a sealing composition possessing a limited solubility in water and which can be spotted at a predetermined position in an earth structure and maintained there until a hard, infusible and insoluble product is attained. It is a further object of the invention to provide a composition which will permeate water bearing earth structures in oil wells whereby the resultant insoluble and infusible hardened product is in effect anchored in and upon such structures to form an impermeable water barrier thereupon.

It is a further object of the invention to provide a method of sealing permeable earth structures with a water insoluble barrier by a composition that can be controlled under substantially all conditions normally existing in oil wells and in oil and water bearing sands and alkaline earth formations.

It is also an object of the invention to provide a sealing composition which may be stored for long periods of time but which under the conditions existing in oil and water bearing structures may be controllably changed to an insoluble, infusible, hard, water sealing barrier in predetermined and relatively short periods of time.

It is also an object of the invention to provide a composition capable of permeating earth structures and not adversely affected by the turbulence normally existing in such structures and which may be changed in short periods of time to hard, insoluble water barriers.

In accordance with the present invention, a liquid resin normally relatively stable at room temperature is placed in a water permeated zone and maintained there for a relatively short period of time with or without added pressure during which time the liquid resin will enter the desired permeable zone, cavern or channel and gel, and then further set to a hard, insoluble and infusible barrier.

The means of determining the location of the water permeated zone is no part of the present invention as such means are old and well known. Further, the methods of spotting the liquid resin in the water permeated zone are conventional and form no part of the present invention.

The liquid resins employed as sealing compositions of the present invention comprise those liquid resins classed as phenolic resins such as those obtained from phenols, cresols, xylenols, resorcinol, etc., and an aldehyde. They are in themselves resins, are prepared as such and are not resin forming liquids which contain several ingredients and react to form resins.

Example I

A phenol-formaldehyde liquid resin is a product produced by the interaction of phenol and formaldehyde. Such interactions may be induced either with or without catalysts. The control of the mol ratio between the phenol and formaldehyde is important and, in general, the amount of formaldehyde per mol of phenol should be maintained within the limits of 0.7 mol to 2.5 mol formaldehyde; preferably the mol ratio will be 1 mol of phenol to about 1.5 mol formaldehyde and, in general, the reaction will be effected in the presence of an alkaline catalyst. Such liquid resins, after dehydration, will tolerate water up to about 100% or equal parts based on the weight of the water free resin. The specific gravity of such liquid phenol-formaldehyde resins is relatively high and varies from 1.15 to 1.30.

Liquid resins so made contain sufficient formaldehyde fully combined with the phenol to make the resultant product capable of setting. Such products are distinguished from other resinous materials in that they are capable of setting eventually to an infusible and insoluble hard resinous mass at any temperature without the necessity of adding other ingredients, hardeners or accelerators. Furthermore, due to the limited water solubility, these liquid resins are not diluted and washed away by the water in the bore hole. The time required for such liquid resins to change from a liquid to an infusible, insoluble, hard solid will decrease as the temperature is increased. Thus the setting of the liquid resin is merely accelerated by temperature but is not dependent upon it since setting will occur at any temperature. Furthermore, the setting time of the phenol-formaldehyde liquid resins, at a given temperature, can be regulated and controlled to produce hard, water insoluble barriers in predetermined and specified periods of time, periods of time so short that the turbulence encountered in a well bore does not prevent the proper anchoring of the resultant resin in the structure and forming a coherent impermeable hard barrier.

The liquid resin of the phenol-formaldehyde type used here for purposes of illustration can be prepared by reacting one mol of phenol with from 0.7 mol to 2.5 mol formaldehyde in the presence of 0.025 to 0.05 mol caustic soda. The mixed ingredients are heated to 85 to 90° C. and maintained at about this range until separation of water occurs. The reaction mixture is then placed under vacuum and dehydrated to a point where the water content remaining in the mixture is not more than 15% based on the weight of the water free liquid resin. The resultant product will have a water solubility of not more than 100% and a specific gravity of from 1.15 to 1.30. The liquid resin will gradually set at room temperature. This tendency of setting can be slowed down to a considerable degree by maintaining the liquid resin in cold storage, say 35 to 40° F.

Example II

A resorcinol-(m-dihydroxy benzene)-formaldehyde liquid resin is a product produced by the interaction of resorcinol and formaldehyde. Such interactions may be induced either with or without catalyst. Resorcinol is very highly reactive with formaldehyde. Other meta substituted phenols such as metacresol and symmetrical xylenol possess pronounced reactivity and may be used in the invention but practical operating considerations dictate a preference for resorcinol and its derivatives. The control of the mol ratio of formaldehyde to the resorcinol therefore becomes highly important to produce liquid resins of the desired characteristics. The reactivity of resorcinol and formaldehyde as compared with the reactivity of phenol and formaldehyde can best be exemplified as follows. Most any amount of formaldehyde can be fully condensed with phenol and the liquid resins so produced can be dehydrated. The polymerization to an infusible and insoluble stage will then proceed slowly but can be arrested or minimized by storing at temperatures of approximately 30 to 50° F.

The mol ratio of formaldehyde and resorcinol on the other hand must be accurately controlled to produce controllable liquid resins. Using more than .75 mol of formaldehyde to 1 mol of resorcinol the reaction will proceed at such a rapid rate that the resinous product will gel while being formed. The gelling is entirely due to the formaldehyde content and cannot be controlled or eliminated by such manipulations as rate of addition or practical temperature control.

A resorcinol-formaldehyde resin can be made by heating resorcinol to 40 to 100° C. in a suitable reaction vessel and adding no more than .75 mol of formaldehyde for every mol of resorcinol and continuing the reaction until the formaldehyde is fully combined. It may then be dehydrated if desired.

Resorcinol resins produced in this manner are characterized by their fusibility and solubility. They will not convert to insoluble or infusible masses on the application of heat or the addition of catalysts. They are, however, further reactive with formaldehyde, formaldehyde derivatives and other aldehydes.

Example III

A combination resin can be made using resorcinol, other phenolic bodies and formaldehyde.

1000 grams USP phenol
800 grams formaldehyde (37% by weight)
50 grams sodium hydroxide dissolved in 50 grams water Place ingredients in a suitable reaction vessel and heat to 60 to 70° C. and hold until the formaldehyde is fully combined. Then add 100 grams resorcinol and when dissolved in the phenol resin, add 100 grams formaldehyde. Reflux and dehydrate to any desired viscosity. The amount of resorcinol used is not limited herein to the quantity stated as it can vary from approximately 5 to 100% or higher, based on the weight of the phenol used.

Resorcinol resins such as produced in Examples II and III can be made to set at any temperatures found in oil bearing earth formations to infusible and insoluble masses by the addition of formaldehyde, formaldehyde derivatives or other aldehydes. The speed with which these resins will set to infusible and insoluble masses can be further controlled by the addition of suitable acids or alkalies. These resins are further characterized by their ability to set to infusible and insoluble masses in the presence of alkalies and in a predetermined and specified period of time; for example, 15 minutes to 24 hours at any temperature found in oil bearing earth formations. Regular phenolic liquid resins can be made to set in most any period of time and at most any temperature by the use of suitable acid catalysts. They cannot, however, be made to set at temperatures below 200° F. very rapidly when alkaline. Under such alkaline conditions, days, weeks or months, depending upon the temperature, are required to reach a hard, insoluble and infusible stage.

Phenol-formaldehyde liquid resins, such as produced in Example I, can be made to set to hard, infusible and insoluble masses by mechanically mixing with resorcinol-formaldehyde liquid resins such as produced in Example II, and formaldehyde. The novel feature of such mixes is that they can be made to set hard and in relatively short periods of time while alkaline or in the presence of alkalies. The amounts of resorcinol-formaldehyde resin added to the phenol-formaldehyde resin will vary from 10 to 100% (or more) based on the weight of the phenol resin and the set time can be varied accordingly, at any practical temperature, from 15 minutes to 6 to 8 hours, with or without acceleration by added alkalies such as sodium hydroxide.

The principal object of this invention, therefore, is to provide a sealing composition that can be utilized in limestone earth formations without affecting the formation other than anchoring in and upon such structures to form an impermeable water barrier.

In employing the liquid resin compositions of the present invention for sealing permeable earth formations, we proceed as follows:

Example IV 46 parts resin produced in Example I
50 parts resin produced in Example II
4 parts paraformaldehyde Such a mixture will reach a gel stage in 7 hours at 77° F. It can be further accelerated by adding 4% NaOH in water solution to gel in 4 minutes. With 2% of NaOH the gelling will occur in 35 minutes at 77° F.

When the paraformaldehyde is omitted the mixture will gel in 13 hours and 4% of NaOH in water solution will cause it to gel in 8 hours at 77° F.

Example V 100 parts resin as produced in Example II
10 parts paraformaldehyde Resin as produced in Example II will not gel in one week at 77° F. Adding 4% NaOH in water solution does not effect a gel in 1 week. Adding paraformaldehyde as in Example V, a gel is effected in 3 hours at 77° F. and addition of 2% NaOH in water solution will further accelerate it and effect a gel in 1 hour.

Example VI 100 parts resin as produced in Example III
10 parts paraformaldehyde Resin as produced in Example III will not gel in one week at 77° F. Adding 4% NaOH in water solution does not effect a gel in 1 week. Adding paraformaldehyde as in Example VI, a gel is effected in approximately 1½ hours at 77° F. Additions of NaOH have little or no accelerating effect.

The following examples of actual field trials show that the temperature of the well has little effect upon the plugging and sealing action of the liquid sealing resin of the present invention. To a well approximately 3500 feet deep, in a limestone formation, and having a bottom hole temperature of 116° F., was added a liquid resin made up of 50 parts of the resin of Example I and 46 parts of the resin of Example II and 4 parts of paraformaldehyde. Five gallons of this mixture was spotted in the bottom hole and it was determined, after 1¾ hours, that the resin had set, whereupon an additional 5 gallons was added and, at the end of 1¾ hours, a third batch of 5 gallons added. The well, before treatment, produced 24 barrels of oil and 388 barrels of water per day. Immediately after the plug back, the well produced 48 barrels of oil and 160 barrels of water. The amount of water flowing gradually decreased after this treatment and the oil content increased.

To another well in a limestone formation, and having a bottom hole temperature of 67° F., the same type of material and treatment was applied and after 7 hours, the plug was successfully set and the water flow substantially eliminated.

Resin plugs of the type herein described have been successfully employed where inorganic plugs have failed. Thus, to a well in which 110 sacks of Portland cement had failed to effect a seal, liquid phenol resorcinol resin and aldehyde was added in the amount of 27 gallons and the oil flow which, before the resin treatment was one barrel to approximately 600 barrels of water, was reduced so that the well was producing 65% oil and only 35% water.

It will be understood that formaldehyde may be used in lieu of paraformaldehyde and that the aldehydes generally may be employed in the preparation of the liquid phenol-aldehyde resins.

It will be understood also that free aldehyde need not necessarily be added to the mixture. The aldehyde may be present in the mixture because of incomplete reaction between the aldehyde and phenol used, or the aldehyde may be present in a combined state where it will, under proper conditions, further combine with the phenols to produce hard, set, infusible resinous masses. Such aldehyde is designated herein as reactive aldehyde.

It will be further understood that other resorcinol derivatives can be used to put the present invention in practice such as, for example, cashew nut shell oil and cashew nut shell oil polymers and their reaction products with phenol and/or aldehydes, or reaction products of resorcinol and ketones such as acetone, or reaction products of resorcinol and olefins. The term "liquid resin" or the term "liquid resinous sealing composition" as used herein refers to materials which need only be liquid under the conditions prevailing in the permeable earth formation to be sealed.

What is claimed is:

1. A liquid resinous sealing compound having a pH greater than 7 for treatment of permeable earth formations comprising a mixture of (a) a phenol aldehyde liquid resin wherein the aldehyde is between 0.7 to 2.5 mols per mol of the phenol and (b) a resorcinol aldehyde liquid resin wherein the aldehyde is less than 0.75 mol per mol of resorcinol, and (c) a reactive aldehyde in an amount sufficient to convert the mixture to an infusible, insoluble set resin.

2. A liquid resinous sealing compound having a pH greater than 7 for treatment of permeable earth formations comprising a mixture of (a) a phenol aldehyde liquid resin wherein the aldehyde is between 0.7 to 2.5 mols per mol of the phenol and (b) a resorcinol aldehyde liquid resin wherein the aldehyde is less than 0.75 mol per mol of resorcinol, the liquid resorcinol resin being present in an amount greater than 5% based on the phenol aldehyde resin, and (c) a reactive aldehyde in an amount sufficient to convert the mixture to an infusible, insoluble set resin.

3. A liquid resinous sealing compound having a pH greater than 7 for treatment of permeable earth formations comprising a mixture of (a) a phenol aldehyde liquid resin wherein the aldehyde is between 0.7 to 2.5 mols per mol of the phenol and (b) a resorcinol aldehyde liquid resin wherein the aldehyde is less than 0.75 mol per mol of resorcinol, the resorcinol resin being present in an amount between 10 to 100% based on the phenol aldehyde resin, and (c) a reactive aldehyde in an amount sufficient to convert the mixture to an infusible, insoluble set resin.

4. The method of treating a permeable zone in an earth formation which comprises placing in the zone to be treated a liquid mixture having a pH greater than 7 comprised of (a) a phenol aldehyde liquid resin wherein the aldehyde is between 0.7 to 2.5 mols per mol of the phenol and (b) a resorcinol aldehyde liquid resin wherein the aldehyde is less than 0.75 mol per mol of resorcinol, and (c) a reactive aldehyde in an amount sufficient to convert the mixture to an infusible, insoluble set resin, and forming a hard set resin in said zone.

5. The method of treating a permeable zone in an earth formation which comprises placing in the zone to be treated a liquid mixture having a pH greater than 7 comprised of (a) a phenol aldehyde liquid resin wherein the aldehyde is between 0.7 to 2.5 mols per mol of the phenol and (b) a resorcinol aldehyde liquid resin wherein the aldehyde is less than 0.75 mol per mol of resorcinol, the liquid resorcinol resin being present in an amount greater than 5% based on the phenol aldehyde resin, and (c) a reactive aldehyde in an amount sufficient to convert the mixture to an infusible, insoluble set resin, and forming a hard set resin in said zone.

6. The method of treating a permeable zone in an earth formation which comprises placing in the zone to be treated a liquid mixture having a pH greater than 7 comprised of (a) a phenol aldehyde liquid resin wherein the aldehyde is between 0.7 to 2.5 mols per mol of the phenol and (b) a resorcinol aldehyde liquid resin wherein the aldehyde is less than 0.75 mol per mol of resorcinol, the resorcinol resin being present in an amount between 10 to 100% based on the phenol aldehyde resin, and (c) a reactive aldehyde in an amount sufficient to convert the mixture to an infusible, insoluble set resin, and forming a hard set resin in said zone.

JAY C. SEARER.
ALVIN F. SHEPARD.
FRANK W. LESS.

REFERENCES CITED

The following references are of record in the file of this patent:

UNITED STATES PATENTS

| Number | Name | Date |
|---|---|---|
| 1,802,390 | Novotny | Apr. 28, 1931 |
| 1,889,751 | Kessler | Dec. 6, 1932 |
| 2,221,261 | Lehnhard | Nov. 12, 1940 |
| 2,236,836 | Prutton | Apr. 1, 1941 |
| 2,274,297 | Irons et al. | Feb. 24, 1942 |
| 2,294,294 | Grebe | Aug. 25, 1942 |
| 2,338,799 | Buckley et al. | Jan. 11, 1944 |
| 2,345,611 | Lerch et al. | Apr. 4, 1944 |
| 2,414,416 | Rhodes | Jan. 14, 1947 |

Certificate of Correction

Patent No. 2,527,581

October 31, 1950

JAY C. SEARER ET AL.

It is hereby certified that error appears in the printed specification of the above numbered patent requiring correction as follows:

Column 1, line 12, before the word "formation" insert *earth*; column 3, line 38, for "so complete" read *no complete*;

and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*